US005468938A

United States Patent [19]
Roy

[11] Patent Number: 5,468,938
[45] Date of Patent: Nov. 21, 1995

[54] MICROWAVE RADIATION INSERT EXTERMINATOR

[76] Inventor: Stephen Roy, 10117 Sepulveda Blvd., Suite 206, Mission Hills, Calif. 91345

[21] Appl. No.: 188,356

[22] Filed: Jan. 26, 1994

Related U.S. Application Data

[63] Continuation of Ser. No. 408,273, Sep. 18, 1989, abandoned.

[51] Int. Cl.⁶ .................................................. H05B 6/80
[52] U.S. Cl. ..................... 219/690; 219/695; 219/710; 219/757; 43/112
[58] Field of Search ..................... 219/679, 690, 219/695, 696, 710, 746, 748, 757; 43/112, 132.1, 124

[56] References Cited

U.S. PATENT DOCUMENTS

| | | | |
|---|---|---|---|
| 3,745,291 | 7/1973 | Peterson et al. ............... | 219/748 |
| 3,814,890 | 6/1974 | Klemp et al. ................... | 219/748 |
| 4,236,055 | 11/1980 | Kaminaka ....................... | 219/10.55 B |
| 4,370,534 | 1/1983 | Brandon .......................... | 219/10.55 A |
| 4,383,156 | 5/1983 | Furusawa ......................... | 219/10.55 B |
| 4,416,908 | 11/1983 | McKinney et al. .............. | 219/10.55 R |
| 4,434,345 | 2/1984 | Muscatell ......................... | 219/10.55 R |
| 4,517,430 | 5/1985 | Slottag ............................. | 219/10.55 B |
| 4,778,970 | 10/1988 | Klaila ............................... | 219/10.55 A |

*Primary Examiner*—Philip H. Leung
*Attorney, Agent, or Firm*—Lewis Anten; Amedeo Ferraro

[57] ABSTRACT

A non-toxic extermination device is disclosed herein having an RF radiation generator providing microwave, high frequency waves for penetration through solid obstacles such as walls, floors, partitions or the like. The generated waves are characterized as being effective to cause insect internal molecular friction to generate deadly heat.

12 Claims, 1 Drawing Sheet

5,468,938

MICROWAVE RADIATION INSERT EXTERMINATOR

This application is a continuation of application Ser. No. 07/408,273, filed Sep. 18, 1989 now abandoned.

BACKGROUND OF THE INVENTION

1. Field of the Invention

The present invention relates to the field of insect and bug extermination, and more particularly to a novel exterminating device employing microwave energy which is generated and distributed over an area intended to be freed of insects, bugs or the like.

2. Brief Description of the Prior Art

In the past, it has been the conventional practice to effect the extermination of bugs and insects by employing a variety of aerosol or other pressurized systems for distributing a wet mist in a limited area in order to spread a chemical substance for contacting specific insects or bugs. Such devices are normally called "foggers" and employ a pressurized canister with a manually released valve for discharging a wet toxic chemical vapor into the surrounding air.

Difficulties and problems have been encountered when using such prior chemical dispensing devices which stem from the fact that the discharge is a wet mist which is heavy and has a tendency to drop upon surrounding floor areas so that only a relatively small area is serviced by the chemical. Also, wet mists generally leave a residue on furniture, sinks, wall surfaces or any utensils or other items upon which the wet mist comes into contact.

Another problem resides in the fact that the chemicals used are highly toxic in such systems and great care must be taken to remove any food, utensils or other articles upon which the wet mist may come into contact so that the chemical is not inadvertently ingested by humans or animals.

Still a further problem with such toxic chemicals resides in the fact that pests, such as termites, woodboring beetles, etc. extend into inaccessible areas of a wall or floor structure as well as in spaces between the floors and certain ceiling areas. Current methods involve either employment of the wet mist or gas fumigation systems of the entire structure or physically opening the infested area so that it can be treated with a toxic chemical. Both of these methods require considerable inconvenience to the occupant as well as the release of toxic chemicals into the surrounding environment.

Therefore, a long standing need has existed to provide a novel extermination system for such pests which is dry and that is non-toxic to humans or animals. Such a system vastly increases the total area over which the effects of extermination are distributed so that its effectiveness is increased for exterminating bugs, insects and particularly wood-boring pests. Also, such a novel extermination system may be used again and again so that it is not necessary to dispose of pressurized cans or containers.

SUMMARY OF THE INVENTION

Accordingly, the above problems and difficulties are obviated by the present invention which provides a novel pest exterminating means employing microwave energy in the form of high frequency radio waves in the range of less than 3 meters in length so that the energy will penetrate through walls, floors or other structures in which the pests or insects are found. The apparatus of the present invention includes a magnetron assembly having a variable horn adapted to radiate radio frequency energy in the range of 2450 megahertz as an example. The magnetron assembly is powered by a rectified high voltage supply energized from an AC power transformer under the control of a timer and relay assembly. The device further includes suitable safety interlock closures for protecting personnel while the device is open for maintenance or inspection. Indicating means and display means are provided showing operating status of the apparatus, and a fan is employed for cooling the magnetron assembly. The unit is powered from a conventional line voltage using standard plug and socket connectors.

In one form of the invention, the magnetron assembly and radiating horn emits microwave energy causing living organisms to a heat buildup through internal molecular friction which kills the pests without disturbing the wall or other materials.

Therefore, it is among the primary objects of the present invention to provide a novel insect, pest and bug exterminating means which includes the generation of microwave energy that is detrimental to pests but is not detrimental to structures, such as walls, floors or the like.

Another object of the present invention is to provide an exterminating device which generates microwave energy in order to eliminate pests, such as termites, wood-boring beetles or the like, that extend into inaccessible areas of a structure.

Yet another object of the present invention is to provide a novel device and method for eliminating pests so that the occupants of an area are not disturbed and so that the removal of plants, pets or foods from the structure is not required.

Another object of the present invention is to provide a novel fumigation and pest extermination system and method that eliminates the necessity for toxic chemicals or fumigants with their possible adverse side effects.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
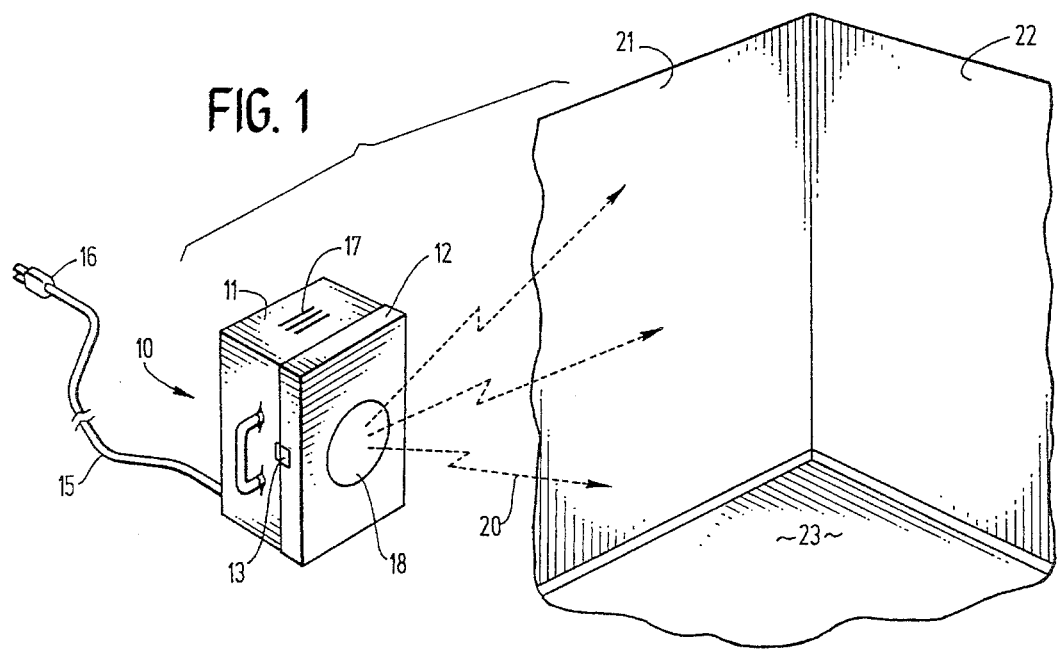
FIG. 1 is a perspective view showing the novel microwave energy generating apparatus of the present invention employed in a typical pest elimination situation.

Referring to FIG. 1, the novel exterminating apparatus of the present invention is indicated in the general direction of arrow 10 which includes a housing 11 having a pivoting lid or cover 12 which is releasably fastened to the housing by means of snap fasteners, such as fastener or latch 13. A handle 14 is provided for transporting the unit from place to place as the unit is not disposable and may be repeatedly used. The unit is preferably operated via line voltage provided by a cord 15 having a plug 16 carried on its free end and adapted to be attached to a socket (not shown) operably coupled to a line voltage source. The apparatus or unit 10 includes a plurality of controls having manual actuators projecting exteriorly of the apparatus and which includes a discharge vent 17 in the top of the apparatus for passing heated air into a surrounding room area in order to cool the interior of the housing. The discharge vent 17 may include a grill to prevent debris from entering into the interior of the unit.

The apparatus 10 is employed for generating microwave energy which is radiating outwardly from a discharge horn 18 and the radiating energy is indicated by the arrows 20. The energy is directed towards walls 21 and 22 comprising a portion of a building or structure intended to have pests eliminated therefrom. Also, the energy is directed towards the floor 23 for achieving the same purpose.

Figure 2:
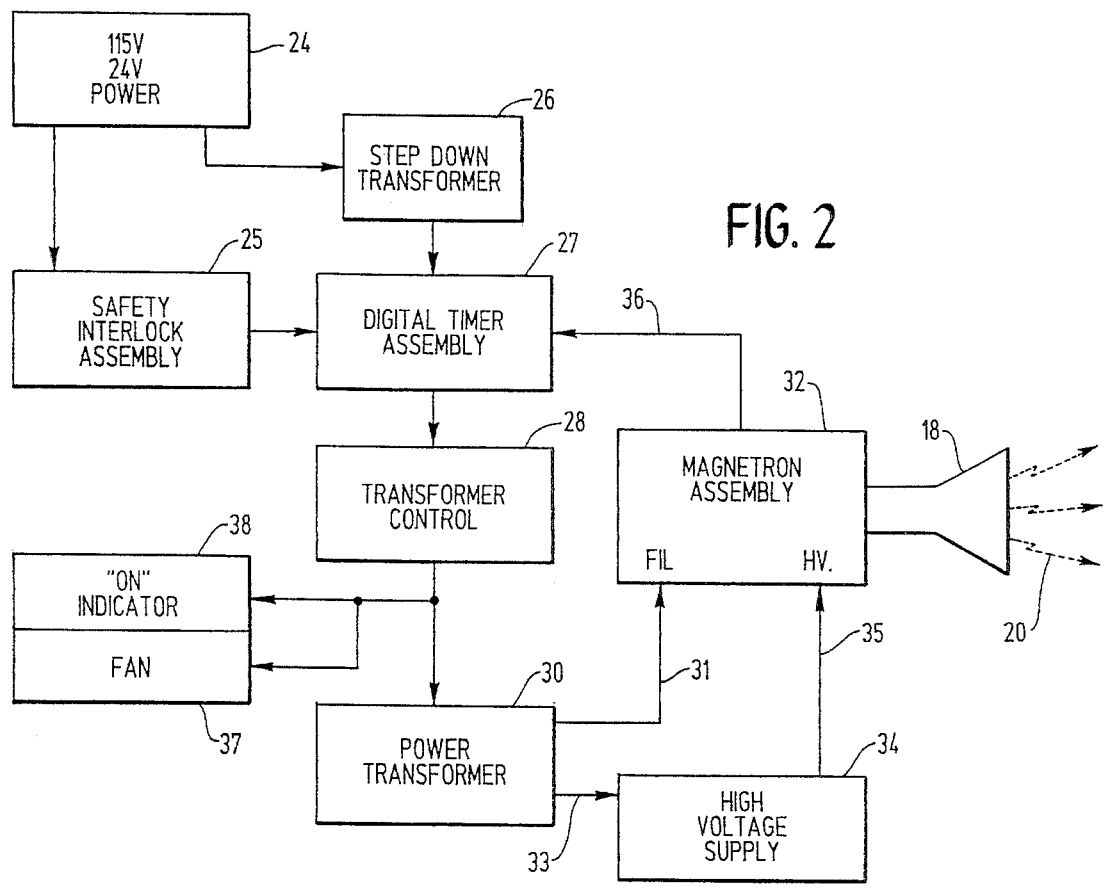
FIG. 2 is a block diagram illustrating the various components employed in the pest elimination device of the present invention used in the environmental setting shown in FIG. 1.

Referring now in detail to FIG. 2, a schematic or block diagram of the present invention is illustrated which is carried within the housing 11 and which is employed for generating microwave energy 20. The power source is indicated by numeral 24 which may be of a battery type of approximately 24 volts or, if desired, line volatage of 115 volts may be used. The power is directed through safety interlock assembly 25 whereby opening of the lid or cover 12 for service or maintenance purposes will disengage the power from the unit. The interlock assembly constitutes a plurality of switches arranged in an electrical series relationship. A stepdown transformer 26 is coupled in parallel with the safety interlock assembly to a digital timing assembly 27 that is actuated by a start button. Starting of the timer assembly supplies power to the transformer control 28 taking the form of a relay to turn an AC power transformer 30 into operation. The power transformer is coupled to a low voltage line indicated by numeral 31 which may be considered a 3 volt AC voltage line going to the filament of a magnetron assembly 32. A high voltage AC line 33 couples the output from the power transformer to a high voltage supply 34. The supply includes a voltage doubler and rectifier so that output line 35 connected to the high voltage of the magnetron assembly 32 carries 4,000 volts of direct current.

An overheating sensor is in the magnetron assembly and is coupled back to the digital timing assembly via lead line 36 so that should an overheating condition be sensed in the magnetron assembly, the unit can be shut off through the timer assembly. Also, in an effort to prevent overheating, a fan 37 is powered from the transformer control 28, as well as an ON indicator 38 so that the operator will know of the operating condition of the unit.

The output of the magnetron assembly via the variable size changing horn 18 is an RF radiation in the range of 2450 mega-hertz and is indicated by the numeral 20. The variable size changing horn 18 is a horn-shaped wave guide having a tubular shaped transition segment coupled to the magnetron assembly and a truncated cone shaped segment. The horn 18 and transition segment feeding it essentially determine the bandwith of the output of the magnetron assembly. The horn 18 is used for directing the output of the magnetron assembly to provide unidirectional coverage of the target area. Pests and other vermin are eliminated using the microwaves which may be considered a high frequency wave less than 3 meters in length in order to penetrate through walls 21, 22 or floor 23 or other solid or semi-solid barriers. The microwave energy causes different materials to either absorb, pass or reflect their energy. Living organisms, such as pests or insects, are composed of primarily proteins, fats or water, and these compositions absorb microwave energy which, in turn, causes a heat buildup through internal molecular friction. The generated heat kills the pests or vermin without disturbing the wall or other materials because these materials will heat at a much slower rate.

In view of the foregoing, it can be seen that the present method and apparatus of the present invention eliminates such pests as termites, wood-boring beetles or the like that extend into inaccessible areas of a structure, such as wall areas, spaces between floors, ceiling areas or the like. The present apparatus does not incorporate wet mists or toxic chemical substances and occupants do not have to leave, evacuate or move out of the area being subjected to pest elimination. Also, occupants need not remove plants, pets or foods from the structure since non-toxic materials are used. The introduction of toxic chemicals or fumigates with their possible adverse side effects are completely eliminated and the release of toxic fumigants into the atmosphere for aeration purposes is completely avoided. Furthermore, by using the microwave generating apparatus and method of the present invention, building structure, such as roof tiles and surrounding landscaping is not broken or damaged due to the conventional practice of employing heavy tarps to cover the structure intended to be fumigated.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An insect exterminating device emitting a microwave frequency signal for exterminting insects located in a structure comprising:

a portable housing adapted to be transported from place to place for repeated use, said portable housing capable of being hand lifted and positioned within a structure;

a low powered magnetron assembly disposed within said housing for generating microwave energy as high frequency waves less than three meters in length;

a variable length horn-shaped wave guiding means operably coupled to said magnetron assembly for radiating said microwave energy through said wave guiding means to uniformly expose a specific target area external to said housing to said microwave energy whereby any insects located in the target area are exterminated by said microwave energy;

power supply means within said portable housing operably connected to said magnetron assembly for powering said magnetron assembly;

said housing includes a fan and vent means in close proximity to said magnetron assembly for cooling said magnetron assembly;

an overheating protection circuit operably coupling said magnetron assembly to said power supply including a temperature sensor enclosed in said magnetron assembly;

a digital timer circuit operatively coupled between said magnetron assembly and said power supply and including an operational starting circuit with a start button;

said power supply further includes a power transformer control coupling a high voltage power transformer to said digital timer assembly; and, an output of said power transformer coupled to said magnetron assembly via a high voltage rectified power supply.

2. The insect exterminating device of claim 1 in which said horn-shaped wave guide comprises a tubular transition segment and an truncated cone segment.

3. The insect exterminating device of claim 1 in which said power supply is a battery.

4. An insect exterminating device using microwaves for exterminating insects located in a structure, comprising:

low power microwave generating means for generating microwaves;

a portable housing means for housing said microwave generating means, said housing means capable of being hand lifted and positioned within a structure;

power supply for supplying electrical power to said generating means;

control means for controlling said microwave generating means;

horn-shaped wave guiding means for directing said microwaves to uniformly expose a desired target area external to said housing and to direct said microwave energy away from the operator of said exterminating device whereby insects are exterminated by said microwaves.

5. The insect exterminating device of claim 1 in which said horn-shaped wave guiding means comprises a tubular transition segment and a truncated cone segment.

6. The insect exterminating device of claim 1 in which said horn-shaped wave guiding means is a variable length radiation horn.

7. The insect exterminating device of claim 4 in which said microwave generating means is a magnetron assembly.

8. The insect exterminating device of claim 4 in which said power supply is a battery.

9. The insect exterminating device of claim 4 including an overheating protection circuit operably coupling said microwave generating means to said power supply including a temperature sensor.

10. The insect exterminating device of claim 4 including a digital timer circuit operatively coupled between said microwave generating means and said power supply and including an operational starting circuit with a start button.

11. The insect exterminating device of claim 10 in which said power supply further includes a power transformer control coupling a high voltage power transformer to said digital timer assembly.

12. The insect exterminating device of claim 11 including an output of sasid power transformer coupled to said microwave generating means via a high voltage line.

* * * * *